United States Patent [19]

Adams et al.

[11] 4,432,822

[45] Feb. 21, 1984

[54] METHOD OF MANUFACTURING UPHOLSTERY PANELS

[75] Inventors: Ronald W. Adams, Auburn; Theodore W. Johnson, Monmouth, both of Me.

[73] Assignee: Albany International Corp., Albany, N.Y.

[21] Appl. No.: 366,489

[22] Filed: Apr. 8, 1982

[51] Int. Cl.³ .................. B29C 31/00; B32B 31/06; B32B 31/20
[52] U.S. Cl. .................. 156/148; 156/219; 156/220; 156/242; 156/245; 156/252; 156/272.2; 156/290
[58] Field of Search ............... 156/148, 157, 219, 220, 156/242, 245, 252, 290, 272.2

[56] References Cited

U.S. PATENT DOCUMENTS

| | | | |
|---|---|---|---|
| 2,573,466 | 10/1951 | Lyijynen | 156/219 |
| 2,578,709 | 12/1951 | Lyijynen | 156/219 |
| 2,618,581 | 11/1952 | Lyijynen | 156/220 |
| 3,046,179 | 7/1962 | Stallard | 156/219 |
| 3,833,439 | 9/1974 | Smith | 156/252 |
| 4,199,635 | 4/1980 | Parker | 156/62.2 |

Primary Examiner—Caleb Weston
Attorney, Agent, or Firm—Kane, Dalsimer, Kane, Sullivan & Kurucz

[57] ABSTRACT

Disclosure is made of a new and novel method of producing upholstered panels having a plurality of different textile surfaces. The panels are useful to upholster the interior of transportation vehicles.

3 Claims, 8 Drawing Figures

METHOD OF MANUFACTURING UPHOLSTERY PANELS

BACKGROUND OF THE INVENTION

1. Field of the Invention

The invention relates to decorative, upholstered panels and methods for their manufacture.

2. Brief Description of the Prior Art

The prior art literature is replete with descriptions of a wide variety of methods for the manufacture of upholstery panels, commonly used to upholster the interior of transportation vehicles such as automobiles, airplanes and the like. Representative of such descriptions is that found in U.S. Pat. No. 4,199,635.

In recent years, the automobile industry has been interested in employing several diverse upholstery materials in a single motiff. For example, a door panel may be upholstered with a carpeting material near the panel bottom, an imitation leather centerpiece and a vinyl top portion. Prior to the present invention, panels of the type described above were made by bonding the various materials to a molded substrate in a multi-step operation. Bonding could be effected by the dielectric process, adhesives or like techniques. In some cases, the surface materials are combined first and bonded together prior to their being fastened to the substrate. The substrate is normally cardboard, pressboard, injection molded polymeric resin sheets or the like.

The method of the present invention permits one to manufacture upholstered panels having a face of a plurality of upholstery materials. The joining, bonding and molding of the component parts takes place during a single molding step without the use of large quantities of adhesives, making for lower cost panels. The panels prepared by the process of the invention are esthetically acceptable and pleasing in appearance. The elimination of the sole use of glues and adhesives in their manufacture is also an advantage, reducing the hazards of solvents generally associated with the use of glues and adhesives.

In comparison to prior art panels of polymeric resins, the panels of the present invention are also advantageous in that they are relatively non-volatile, producing few gases which can condense and deposit on surfaces near their installation, for example, on the interior of an automobile. This phenomena has been observed in recent years and is considered a serious drawback to the use of certain polymeric resin panels in vehicle interiors.

SUMMARY OF THE INVENTION

The invention comprises a method of manufacturing an upholstered, decorative, panel having a plurality of diverse, upholstery materials which together form the decorative, upholstered surface, which comprises;
  (a) providing a panel base support which comprises;
    a core of non-woven, synthetic textile fibers;
    a base first layer of heat fusible, synthetic, thermoplastic textile melt fibers;
    a base second layer selected from the group consisting of a film of a synthetic, polymeric resin and a layer of heat fusible, synthetic, thermoplastic textile melt fibers;
    a base second layer which comprises a film of synthetic polymeric resin;
    said first and second layers sandwiching the core, fibers of said first layer and the core being interengaged with each other and with the second layer, said interengagement being of the character obtained by needling; and
    a batt of non-woven textile fibers attached to the second layer by needling;
  (b) providing a panel intermediate layer of a synthetic, open or closed cell, polymeric resin foam;
  (c) providing an outer, surface layer formed from a plurality of diverse sheets of decorative, surface upholstery materials, joined together along seam lines;
  (d) assembling the base (a) with the surface layer (c) so as to sandwich intermediate layer (b), leaving at least a portion of the space between base (a) and layer (c) beneath the seam lines, free of layer (b);
  (e) providing a mold adapted by size and configuration to receive the assembly, said mold including a means for applying heat and pressure along the seam lines of the surface layer (c) in the zones beneath the seam lines which are free of layer (b), when the assembly is received in the mold;
  (f) inserting the assembly in the mold; and
  (g) applying heat and pressure on the assembly in the mold;
whereby portions of the surface layer (c) are bonded to the base layer (a) in those areas of the panel which are free of the intermediate layer (b).

The invention also comprises the panel products of the method of the invention. The panel products are useful as upholstered liners for the interior of transportation vehicles and the like.

DETAILED DESCRIPTION OF THE PREFERRED EMBODIMENTS OF THE INVENTION

Figure 1:
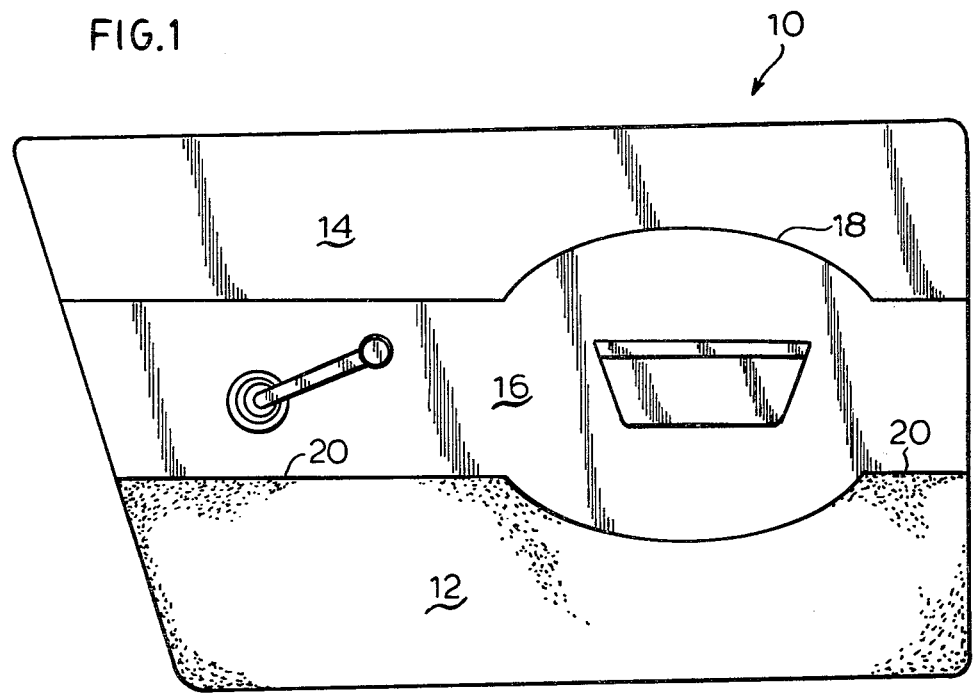
FIG. 1 is a face view of an embodiment panel of the invention.

Referring first to FIG. 1, there is seen a surface view of an embodiment panel 10 of the invention. The surface of the panel 10 comprises a non-woven carpet fabric 12 as a surface lining along the bottom of the panel 10. A vinyl coated textile fabric 14 functions as a surface of the top portion of panel 10. Intermediate between the non-woven carpet fabric 12 and the vinyl coated fabric 14 is a textile body cloth 16 which joins together fabrics 12, 16 and along 14, 16 the joinder or seam lines 18 and 20, respectively. By the method of the present invention, joinder or seam lines 18, 20 are obtained which are pleasing to the eye and do not require additional trim components to hide that which might otherwise be unsightly and crude edges (where the diverse materials 14 and 16 or 12 and 16 meet and bond together along the respective seam lines 18 and 20).

Figure 2:
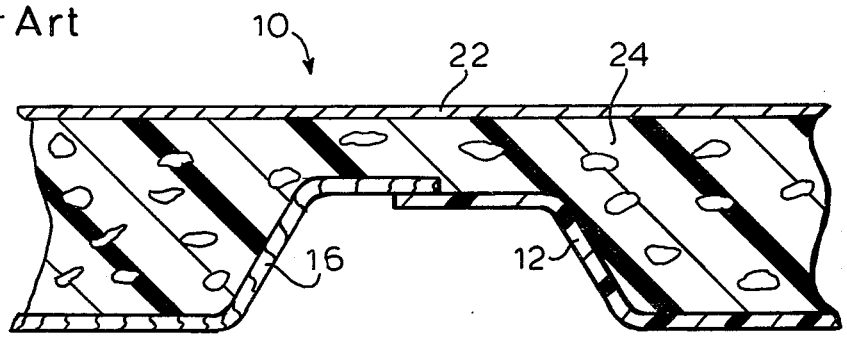
FIG. 2 is a cross-sectional side elevation of a portion of a prior art panel.
Figure 8:
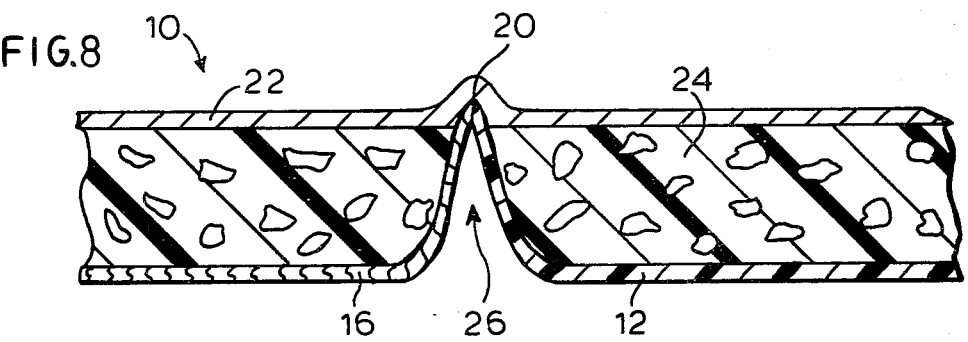
FIG. 8 is a cross-sectional side elevation of a portion of the panel shown in FIG. 7.

Referring now to FIG. 2, one can see a cross-sectional side elevation of a portion of a prior art panel similar to the panel shown in FIG. 1. In FIG. 2, component structures similar to those found in the embodiment panel 10 are designated by the same numerals used in FIG. 1. Thus, the panel 10 of the prior art consists of a substrate layer 22 and surface layers such as layers 16 and 12 described above. An intermediate synthetic, polymeric resin foam layer 24 separates the substrate layer 22 from the surface layers 12, 16. As can be seen in the FIG. 2, the diverse surface layers 12, 16 in the prior art structure overlap where they are bonded together, leaving an unsightly seam, due to the prior art process employed in its manufacture. For comparative purposes, one may observe FIG. 8 which is a cross-sectional side elevation of a portion of the panel 10 prepared by the method of the present invention. As will be observed in FIG. 8, the surface, diverse layers 12, 16 are fused together in a crevice 26 thereby presenting a neat joinder along the seam line 20. The process by which the seam line 20 is formed will be described in greater detail hereinafter.

Figure 3:
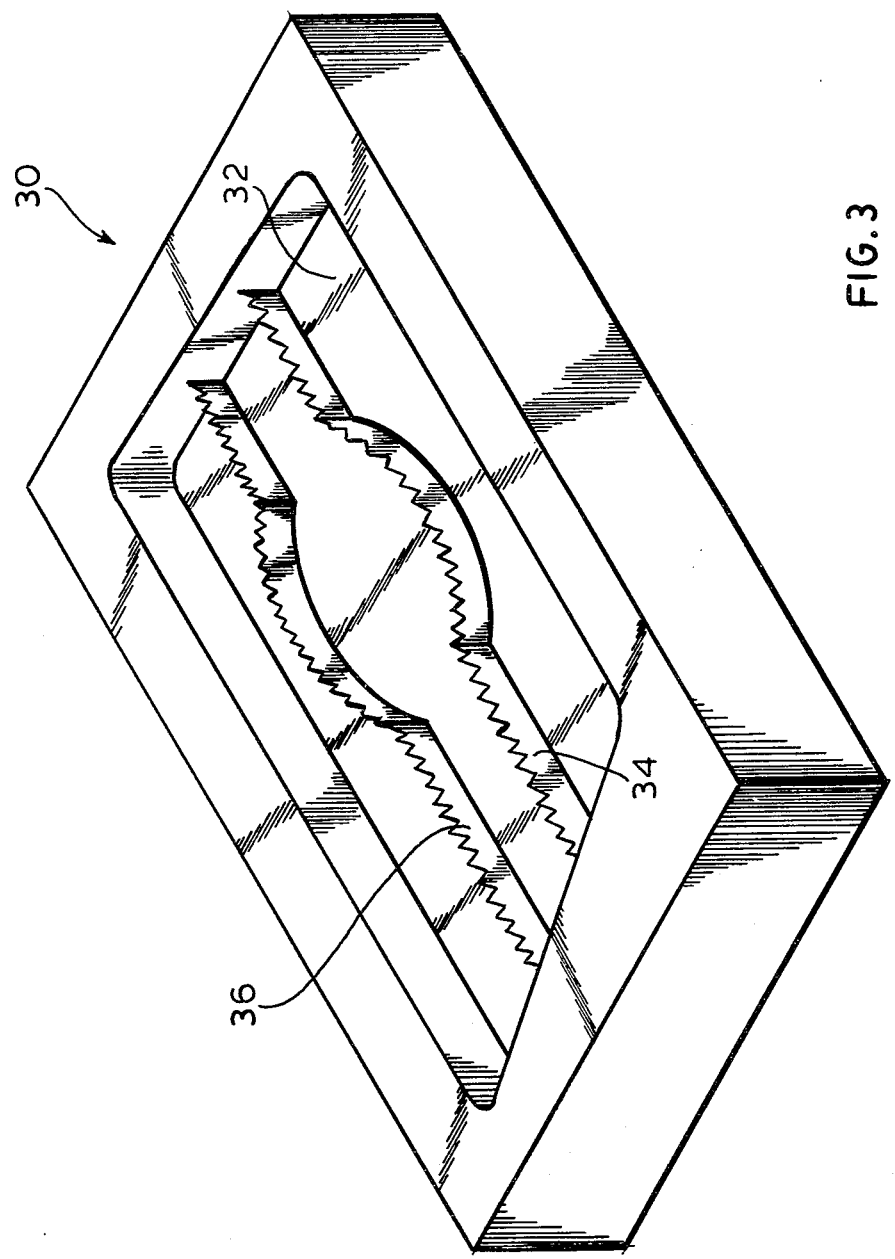
FIG. 3 is a view in perspective of a preferred female mold member used in the production of embodiment panels of the invention.

FIG. 3 is a view in perspective of a preferred female mold member 30 used in the method of the present invention. The female mold member 30 is adapted by size and configuration to receive the assembled component parts making up a panel 10 as shown in FIG. 1. A depressed or mold area 32 contains serrated die members 34 and 36. The die members 34, 36 have a serrated or saw-like upper surface for forming the seam lines 18, 20 in the panel 10. The serrated configuration, or a like configuration is advantageous in that it permits interrupted, and not full contact, between the die members 34, 36 and the panel 10 during molding of the seam lines 18, 20. The die members 34, 36 are positioned within the female mold member 30 so that they align with and correspond to the seam lines 18, 20 of panel 10 as shown in FIG. 1 when the panel 10 is received in the mold member 30. The die members 34, 36 have a height within the depressed area 32 of female mold member 30, which approximates the thickness of the desired panel 10, minus the thickness of the substrate layer 22. The embodiment panel 10 of the invention is molded in female mold member 30 employing the following steps.

Figure 4:
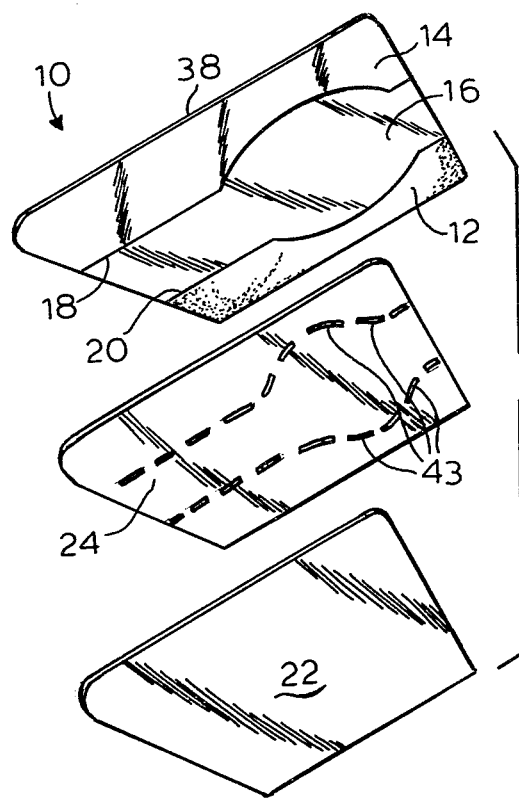
FIG. 4 is a view of a disassembled embodiment panel of the invention.
Figure 5:
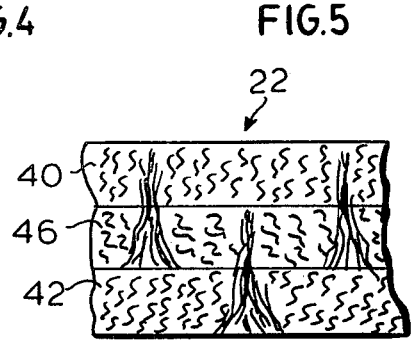
FIG. 5 is a cross-sectional side elevation of a portion of the substrate layer of the panel shown in FIG. 4.

There is first provided a panel base support layer 22 as described above and shown in FIG. 4 (a view-in-perspective of a disassembled panel 10 of the invention). FIG. 5 is a cross-sectional side elevation, enlarged, of the substrate layer 22. As shown in FIG. 5, substrate 22 is a laminate which comprises an upper outer layer 40 of thermoplastic, heat fusible textile fibers. A lower outer layer 42 may be a film of a synthetic, polymeric resin, but is preferably of thermoplastic heat fusible fibers similar to layer 40. Layers 40 and 42 sandwich a core 46 of non-woven textile fibers. All of the layers 40, 42 and 46 are consolidated by lamination under heat and pressure to form an integrated laminate substrate 22 structure of high strength, resistant to delamination. The substrate 22 may be prepared by first laying down a web or layer 40 of woven, knit or non-woven thermoplastic, synthetic, heat fusible polymeric resin fibers. Representative of such fibers are staple fibers of polyolefins such as polyethylene, polypropylene and the like. Representative of the layer 40 is a non-woven web of polypropylene staple fibers. Preferably the layer 40 will have a weight of from about 200 to about 700 grams per meter square and a thickness of from about 3 to about 12 millimeters. In manufacture, the layer 40 receives on one surface an even layered distribution, of loose, unconsolidated, synthetic textile fibers 46. Preferably the synthetic fibers 46 are fibers from shredded textile materials. The synthetic fiber 46 waste material forms a covering layer to receive on its outer surface a second web 42 of woven or non-woven, synthetic thermoplastic, fusible fibers to sandwich the core 46 between webs 40 and 42. The web 42 may be identical to web 40 or alternatively may be a film of a fusible, synthetic, thermoplastic resin such as a film of polyethylene or polypropylene. The sandwich structure consisting of layers 40, 42, 46 is needled together employing conventional needling techniques to consolidate and integrate the three layers. The techniques for needling textile layers together are well-known and need not be considered in detail herein; see for example the descriptions of needling techniques in U.S. Pat. Nos. 2,059,132; 2,910,763 and 3,684,284. Thus, fibers of layers 40, 42 and 46 are interengaged and interlocked with one another, said interengagement being of the character obtained by needling. Preferably, needling is in a single pass with a 32 gauge multibarbed needle set to a density of from 46 to 187 needles per inch. The resulting composite web which comprises substrate 22 may then be laminated under heat and pressure, at a temperature slightly above the softening point temperature of the synthetic, fusible fibers or film in layers 40 and 42. The resulting laminate (substrate 22) is one wherein the various layers 40, 42, 46 are consolidated and integrated together so as to result in a highly stable, delamination resistant substrate for receiving on the surface of layer 40 the remaining components 38, 42 of panel 10. The laminate substrate 22 may be press molded (shaped) and cut into a desired shape and size for use as a substrate of the product panel 10. Alternatively, the non-laminated layers 40, 42 and 46 may be assembled with the components 38, 42 and lamination of the layers 40, 42, 46 under heat and pressure carried out simultaneously with the single molding step when the panel 10 is molded as described hereinafter.

In the FIG. 5, the inverted funnel shapes observed in layers 42 and 46 are representative of the needled fibrous structures within the consolidated layers and are meant to represent the needled joining of those layers.

Referring again to FIG. 4, one can see that the desired product panel 10 of the invention as shown in FIG. 1 comprises the base or substrate panel 22 as described above and a face layer made up of the previously described components 12, 16, 14 which are joined together along the seam lines 18 and 20 by any temporary means such as by stitching, spot adhesives, etc. Intermediate between the face layer of components 14, 16, 12 and the substrate layer 22 is a layer of a synthetic, polymeric resin foam 24 (which may be an open cell or a closed cell foam). In the zone beneath the seam lines 18 and 20, portions of the foam layer 24 have been cut away to provide a space communicating between the face layer 38 and the substrate layer 22. These open spaces 43 between layers 22 and 38 are aligned with and coextensive the seam lines 18 and 20.

Figure 6:
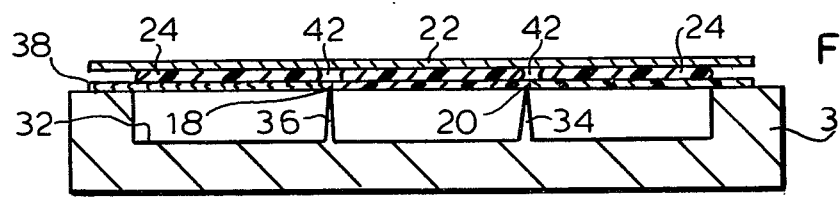
FIG. 6 is a cross-sectional side elevation of the disassembly shown in FIG. 4, assembled and received in the female mold member of FIG. 3.
Figure 7:
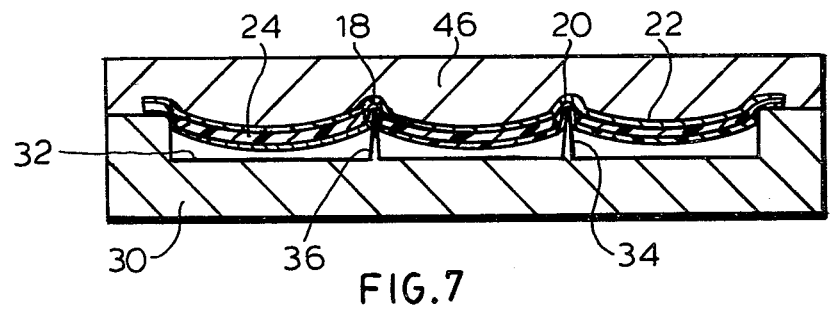
FIG. 7 is a view as in FIG. 6 but following the closing of the mold and bonding of the inserted assembly.

In the next step of the method of the invention, layers 38, 24 and 22 are assembled together as shown in FIG. 6, and placed in the female mold member 30. As shown in FIG. 6, the die members 36, 34 are in alignment with the seam lines 18, 20 and the cut away portions 43 of insulating layer 24. Under heat and pressure as shown in FIG. 7, upon application of the male mold member 46, the face layer 38 is pressed by die members 34, 36 upwardly through the open slots 43 so that in these particular zones along the seam lines 18, 20 the face layer 38 is bonded to the substrate layer 22. In fact, under heat and pressure the face layer 38 is fused into the substrate layer 22 (refer again to FIG. 7).

The techniques of molding textile/thermoplastics under heat and pressure are well known as is the apparatus for doing so; see for Example U.S. Pat. Nos. 4,044,188 and 4,258,093. In general, a molding press may be employed which comprises a lower, stationary platen or mold member such as the female mold member of FIG. 3. The lower, stationary platen may be heated to the fusion temperature of the resin of fibers in layer 42. An upper, moving platen or male mold member may be heated to the fusion temperature of the melt fibers in layer 40. Under heat and pressure in the press, consolidation of the above described composite layers 40, 42, 46 forming panel 22 takes place and the surface fabrics of layer 38 is pressed into the substance of layer 40 through slots 43. The heat fused fibers in layer 40 are expressed into the layer 38 so that layer 38 becomes anchored in layer 40 by the fused fiber melt from the layer 40. The pressure exerted in the press is preferably within the range of from about 5 psi to 400 psi to effect the above described consolidation of the layers. The product panel 10 as shown in FIG. 1 is removed from the press and allowed to cool to ambient temperatures. When cooled, the formed panel 10 will maintain its shape as formed and will exhibit dimensional stability, shape retention and durability. The panels 10 also exhibit advantageous properties of sound and thermal insulation. The panel 10 may be part of the interior upholstery and equipment of an automobile.

The following example describes the manner and process of making and using the invention and sets forth the best mode contemplated by the inventors of carrying out the invention but is not to be construed as limiting.

EXAMPLE

A typical application is the rear upholstery panel of a bucket seat in an automobile used to cover the metal support stamping. It may have an outer area covered by vinyl, a center section of color coordinated body cloth and a bottom kick plate of carpeting.

To produce this panel one ititially provides the fabrics by a die cut of the three trim fabrics 30 mm larger than the area they cover (to allow an overlap on the outside of the panel to ensure that all edges are covered). The area of the fabric material should take into account the depth of draw of the panel being made. Once the trim fabrics are die cut they may be dielectrically bonded together at the seam lines in such a way that the fabric is initially bonded and has the waste cut at the same time, leaving a butt joint with no excess material. The cut fabrics are then laid on the serrated blades of the female mold cavity described in FIG. 3 above in such a manner that serrations of the blade project through the trim fabrics at the seamline.

A layer of polymeric resin foam is cut to fill in the spaces between the edges of the mold and the blades in the mold (for the seam lines). The foam pieces are cut 6 mm smaller than the area which they fill. This will allow the edges to be expected at the seamline and at the perimeter of the panel. The foam layer is laid in the mold by the operator so that no perimeter or seamline is covered.

A substrate such as the substrate layer 22 described above is cut in such a manner as to fit a holding clamp frame which allows heating without shrinking. When the substrate is heated to the molten point of the fibers of the outer layers, it is then brought over the female mold. The male mold is closed forcing the substrate into the female cavity forming the panel. The part is allowed to cool for approximately 2 to 3 minutes after which time it is removed and the edge cut in a conventional manner such as die cut, by water jet, or by saw.

If the panel has a large draw, the trim cloth materials to be used can have a film attached to the back of them. This will permit vacuum forming prior to molding to prevent excessive stretching during the molding operation. The cut panel has fasteners attached by ultrasonic welding, adhesives or similar methods to complete the operation.

What is claimed:

1. A method of manufacturing an upholstered, decorative, panel having a plurality of diverse, upholstery materials which together form the decorative, upholstered surface, which comprises;
   (a) providing a panel base support which comprises;
      a core of non-woven, synthetic textile fibers;
      a base first layer of heat fusible, synthetic, thermoplastic textile melt fibers;
      a base second layer selected from the group consisting of a film of synthetic, polymeric resins and a layer of heat fusible synthetic thermoplastic textile melt fibers;
      said first and second layers sandwiching the core, fibers of said first layer and the core being interengaged with each other and with the second layer, said interengagement being of the character obtained by needling;
   (b) providing a panel intermediate layer of a synthetic, polymeric resin foam;
   (c) providing an outer, surface layer formed from a plurality of diverse sheets of decorative, surface upholstery materials, joined together along seam lines;
   (d) assembling the base (a) with the surface layer (c) so as to sandwich intermediate layer (b), leaving at least a portion of the space between base (a) and layer (c) beneath the seam lines, free of layer (b);
   (e) providing a mold adapted by size and configuration to receive the assembly, said mold including a means for applying heat and pressure along the seam lines of the surface layer (c) in the zones beneath the seam lines which are free of layer (b) when the assembly is received in the mold;
   (f) inserting the assembly in the mold; and
   (g) applying heat and pressure on the assembly in the mold;
whereby portions of the surface layer (c) are bonded to the base layer (a) in those areas of the panel which are free of the intermediate layer (b).

2. The method of claim 1 wherein in (a) the base second layer is a layer of heat fusible, synthetic, thermoplastic textile melt fibers.

3. The method of claim 1 wherein thermoplastic textile melt fibers are fibers of polypropylene.

* * * * *